United States Patent [19]
Earle, III et al.

[11] Patent Number: 5,419,231
[45] Date of Patent: May 30, 1995

[54] ASYMMETRIC BRAIDING OF IMPROVED FIBER REINFORCED PRODUCTS

[75] Inventors: George A. Earle, III, Ballston Lake; August H. Kruesi, Melrose; John E. Stockton, Clifton Park; Deborah C. Kruesi, Melrose, all of N.Y.

[73] Assignee: U.S. Composites Corp., Troy, N.Y.

[21] Appl. No.: 932,732

[22] Filed: Aug. 25, 1992

Related U.S. Application Data

[63] Continuation of Ser. No. 664,235, Mar. 4, 1991, abandoned.

[51] Int. Cl.⁶ .............................................. D04C 1/00
[52] U.S. Cl. ................................................ 87/1; 87/9
[58] Field of Search ................... 87/1, 7, 8, 9, 23, 30, 87/33

[56] References Cited

U.S. PATENT DOCUMENTS

| | | | |
|---|---|---|---|
| 1,439,323 | 12/1922 | Petersen | 87/7 |
| 1,814,223 | 7/1931 | Murphy | 87/9 |
| 2,924,141 | 2/1960 | Kinniburgh | 87/9 |
| 3,141,372 | 7/1964 | Benk | 87/9 X |
| 3,390,602 | 7/1968 | Ohno | 87/7 |
| 4,847,063 | 7/1989 | Smith | 87/7 X |
| 5,048,441 | 9/1991 | Quigley | |

OTHER PUBLICATIONS

NASA Technical Memorandum 101672, John D. Whitcomb, Nov. 1989 "Three-Dimensional Stress Analysis of Plain Weave Composites".

*Primary Examiner*—Joseph J. Hail, III
*Attorney, Agent, or Firm*—Sughrue, Mion, Zinn, Macpeak & Seas

[57] ABSTRACT

Braided constructions provide reinforcement fibers in the production of various articles, particularly composites, in which the braided fibers are entrained in a resin matrix. The mechanical properties of such braided, reinforcement fibers are further enhanced by use of an "asymmetric braiding" technique in which the cross-sectional areas of the fibers employed to form the diagonally crossing braids are substantially different, materially decreasing undulations in the braids at their crossings.

20 Claims, 2 Drawing Sheets

REDUCED UNDULATION ASYMMETRIC, DOWN AND BACK BIAXIAL BRAIDED COMPOSITE

FIG. 1 PRIOR ART
CONVENTIONAL 2-OVER, 2-UNDER
BIAXIAL BRAIDED COMPOSITE

FIG. 2 PRIOR ART

FIG. 3 PRIOR ART
CONVENTIONAL TRIAXIAL
BRAIDED COMPOSITE

FIG. 4 PRIOR ART

FIG. 5
REDUCED UNDULATION ASYMMETRIC, DOWN AND BACK BIAXIAL BRAIDED COMPOSITE

FIG. 6

FIG. 7 PRIOR ART
CARRIER PATH OF A CONVENTIONAL BRAIDING MACHINE

ASYMMETRIC BRAIDING OF IMPROVED FIBER REINFORCED PRODUCTS

This is a continuation of application Ser. No. 07/664,235, filed Mar. 4, 1991, now abandoned.

FIELD OF THE INVENTION

This invention relates to the production of products using braiding techniques for the placement and orientation of continuous, reinforcement fibers (tows and yarns); and more particularly to biaxial and triaxial asymmetric braiding of such products.

BACKGROUND OF THE INVENTION

In the strictest sense, composites comprise a mixture of two or more solid phases combined in various proportions to provide a final material which exhibits properties which are a combination of the properties of the constituent phases. Composites, such as wood and steel, have been employed for many millennia. Continuous fiber reinforced composite materials are replacing wood and metals in many high performance structures because of their superior strength, lighter weight, and the ability to tailor the properties of these materials to a given application. More recently, the term "composite" has been used principally to define the class of materials in which a matrix material, such as plastics (both thermosetting and thermoplastic), metals, or ceramics, are reinforced by strengthening fibers or whiskers. The term "fiber" is used herein to include both homogenous strands (e.g., wire) and rope-like products of either twisted filaments (yarns) or untwisted filaments (tows). Short fibers dispersed through the matrix material can impart improvement in mechanical properties, but the degree of such improvement is limited. Therefore, maximization of strength properties requires the use of continuous strengthening fibers. Various methods have been employed for the placement of such continuous fibers, including, for example, hand lay-up of prepreg materials, robotic tape lay-up, filament winding, and braiding. Until recently, hand lay-up methods have dominated for the production of high performance composites, e.g., for the aerospace and sports industries. Although highly labor-intensive, manual placement permits precise placement of fibers to achieve optimum mechanical characteristics. Tape lay-up can be automated to some extent, but robotic tape lay-up machines are relatively expensive as are the pre-impregnated ("prepreg") materials they require. Filament winding and tubular braiding, both of which can use raw materials (fibers and resins) and which can be readily automated are being used to allow cost-effective manufacture of composite parts in large quantities.

Of the latter two processes, filament winding offers the advantage of higher fiber volume fraction for maximization of properties. Moreover, since the wound fibers lay relatively flat over each other, filament winding can provide better translation of fiber modulus in the finished product. However, filament winding has several disadvantages from a manufacturing standpoint: The wound filaments must remain on the geodesic path, otherwise they will slip sideways relative to the intended winding direction. Maintaining the fibers on the geodesic path is especially difficult when winding over a tapered, stepped, or undulating mandrel. An additional manufacturing problem is encountered if a wound fiber "preform" is to be converted into a composite by the Resin Transfer Molding ("RTM") method. The wound preform has very low integrity; the fibers are prone to shifting, either during handling or by the flow pressure created when the resin is injected into the preform during molding. The strength, stiffness, thermal properties, and hygral properties of the fiber composite are sensitive to changes in angle, therefore filament winding is not usually feasible for making RTM preforms. Because of these disadvantages, braiding has become a popular alternative for making fiber-reinforced products, especially as a means of fabricating complex geometry tubular shapes (tapers, steps, undulations, etc.) and for making preforms for RTM molding.

Figure 7:
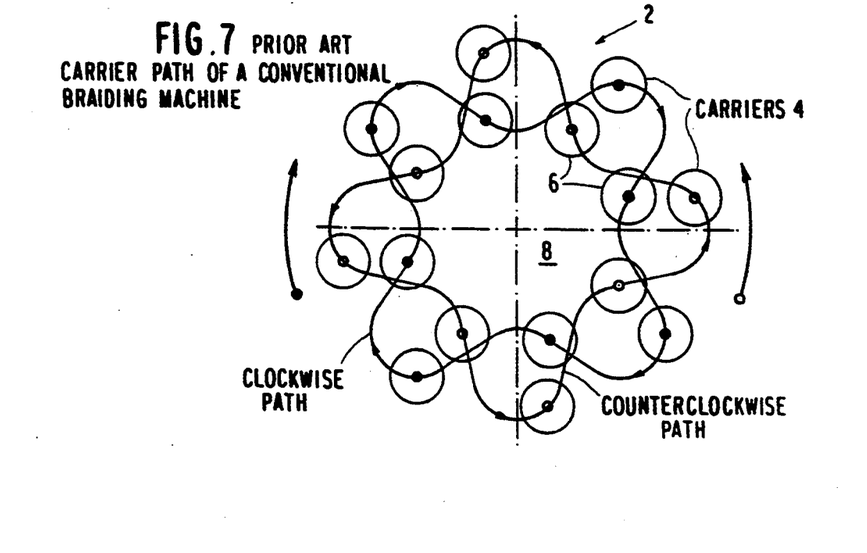
FIG. 7 is a schematic view of the carrier path of a conventional braiding machine.

A tubular braider 2 contains two sets of fiber carriers 4, 6 which travel in intersecting serpentine paths about a central space 8. Fibers from the two sets of carriers are interlaced by the motion of the carriers to form a biaxial braid as illustrated schematically in FIG. 7. A third system of fibers can be introduced parallel to the braid axis to form a triaxial construction.

Braiding creates a self-stable fabric which conforms to tapered, non-round, or even stepped mandrels. The unique conformability of braiding has enabled the manufacture of complex structural features such as screw threads which are integral to a composite tube or shaft. The braided fabric has excellent integrity so distortion is minimized when the fabric is converted to a composite by methods such as Resin Transfer Molding (RTM). The interlocked fiber structure increases out-of-plane strength and gives rise to excellent impact resistance as compared to wound or laminated composites.

However, these advantages are achieved at the expense of some in-plane stiffness and strength. The decreased stiffness and strength are due in large part to fiber undulation in the braided fabric. The structural efficiency of the braided fabric is also reduced because undulation reduces the effective fiber volume fraction, especially in a triaxial braid. This problem is compounded when high modulus fibers such as graphite are used. The cross-over action in the braiding process causes damage, particularly to high modulus fibers. The abrasive damage increases with the number of braider carriers because of the greater number of cross-overs prior to the braid convergence point; thus limiting the size of a structure which can be braided with a high modulus fiber. Applicants have found that a very high modulus graphite fiber (UHM, Hercules) braids very well on a small braider (16 carriers), but is unusable on a large braider (144 carriers) because fiber damage is so severe.

To minimize abrasive damage during braiding, fibers are often twisted. The twist reduces strength and prevents the individual fibers from flattening out resulting in greater undulation in the braid. The twist also interferes with resin impregnation into the fiber bundle; complete impregnation is necessary to achieve good shear and compression properties.

Thus, braiding also has some disadvantages. First, the fiber undulation in the braid detracts from optimum translation of fiber modulus—thereby lowering the achievable strength and stiffness of the composite. Second, the crossover action in the braiding process leads to greater fiber damage, especially with high modulus fibers. Third, the twist imparted in the fibers to minimize braiding damage tends to reduce strength and prevents the individual fiber bundles from flattening out—the resulting near circular fiber bundles create a thicker ply with greater undulation.

Attempts have been made to create asymmetrically braided products including composite structures of the resin molded filament or fiber reinforced types. Such attempts are exemplified by the following U.S. Patents:

U.S. Pat. No. 2,494,389, issued Jan. 10, 1950, entitled "Braided Product and Method for Producing the Same";

U.S. Pat. No. 2,608,124, issued Aug. 26, 1959, entitled "Braided Product and Method for Producing the Same";

U.S. Pat. No. 4,550,639, issued Nov. 5, 1985, entitled "Shaped Mechanical Compression Packing";

U.S. Pat. No. 4,672,879, issued Jun. 16, 1987, entitled "Shaped Mechanical Compression Packing";

U.S. Pat. No. 4,719,837, issued Jan. 19, 1988, entitled "Complex Shaped Braided Structures";

U.S. Pat. No. 4,729,277, issued Mar. 8, 1988, entitled "Shaped Mechanical Compression Packing";

U.S. Pat. No. 4,754,685, issued Jul. 5, 1988, entitled "Abrasion Resistant Braided Sleeve"; and U.S. Pat. No. 4,836,080, issued Jun. 6, 1989, entitled "Vibration Abrasive Resistant Fabric Covering".

U.S. Pat. Nos. 2,494,389 and 2,608,124 disclose a method of braiding of a tubular product of varying diameters over the length of the product by braiding about a mandrel. The braiding consists of a plurality of threads, at least some of which are made up of a plurality of independent strands to form a tubular braided fabric and changing the diameter of the braided product by changing the number of strands making up at least some of the threads entering the braiding operation.

U.S. Pat. Nos. 4,550,639; 4,672,879 and 4,729,277 are all directed to a process for producing a product in the form of a mechanical compression packing of generally rectangular cross-sectional shape in which a plurality of axial warp yarns are placed in a predetermined non-symmetrical pattern such that additional corner fills exist adjacent to the outer corners of the packing material vis-a-vis the amount of corner fills adjacent to the inner corners. The non-symmetry results in longer packing life and reduced shaft wear, when the packing is used to prevent leakage about rotating shafts.

U.S. Pat. No. 4,719,837 is directed to the manufacture of complex shaped braided structures using different numbers of groups of axial yarns relative to groups of braiding yarns via an interlacing pattern, wherein each of the braiding yarns extends in diagonal paths completely through the array to the outer periphery of the structure before any of the braiding yarns extend in the path in another diagonal direction from their reversal point.

U.S. Pat. Nos. 4,754,685 and 4,836,080 create asymmetrical tubular products in which the asymmetry is created by varying the diameters of different yarns such as requiring a nylon yarn to be at least 2 mils larger in diameter than a polyester yarn making up the braided sleeve.

SUMMARY OF THE INVENTION

The present invention is based on the discovery by the applicants that the disadvantages of braiding, i.e., large undulation angles and excessive abrasive damage, can be substantially overcome by asymmetric braiding, in which the braider is intentionally loaded in an uneven pattern, such that the fibers which are loaded onto those carriers which will be moving in one direction will differ significantly in cross-section (and optionally in type of material employed) from the fibers loaded onto the carriers moving in the opposite direction.

Further, the applicants have made use of analytical models which have been developed to predict the moduli of braided composites. These models predict a softening of the in-plane modulus due to fiber undulation. "Waviness ratio" WR is used as a measure of the fraction of fiber tow which is inclined relative to the load direction. The waviness ratio is defined by $l_1/(l_1+l_2)$ where $l_1$ is the length of wavy tow and $l_2$ is the length of straight tow.

The WR for braids is derived from work conducted at NASA, see Three Dimensional Stress Analysis of Plain Weave Composites, NASA Technical Memorandum 101672 by John D. Whitcomb, November 1989.

Figures 1, 2:
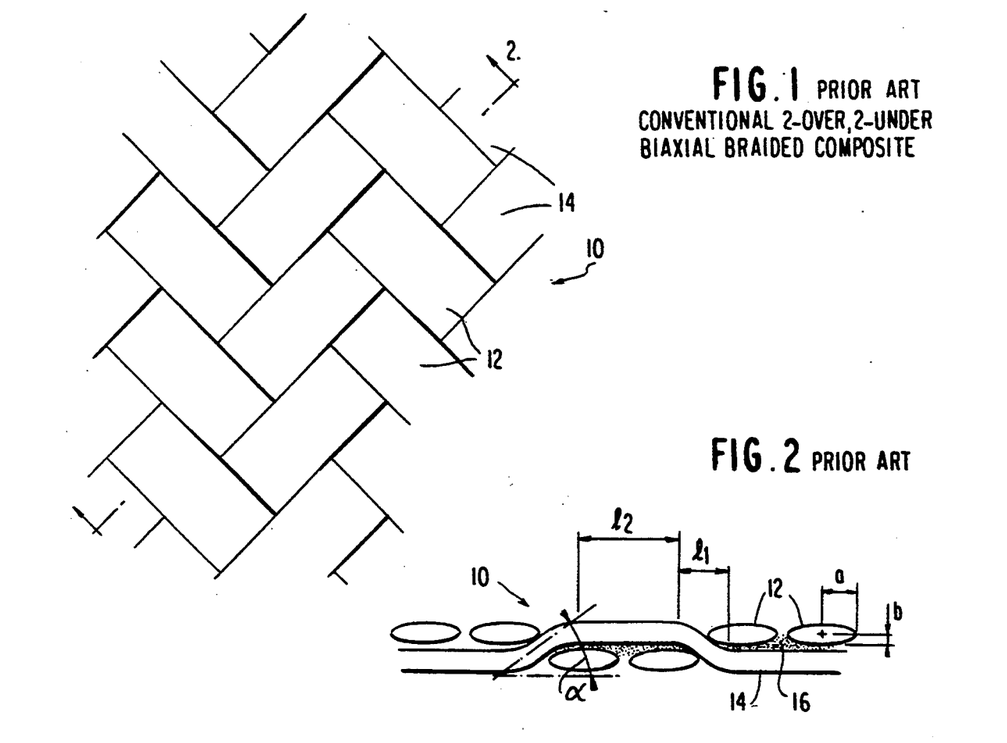
FIG. 1 is a plan view of a conventional, 2-over 2-under braided composite.
FIG. 2 is a sectional view of the braided composite of FIG. 1 taken about line 2—2.

Undulation Angle, $\alpha$ = the maximum angle from the plane of the braid (or a plane tangential to the surface being braided over), FIG. 2.

$\alpha$ is a significant variable in evaluating such performance factors as strength, modulus, toughness.

Analytical results indicate that the longitudinal modulus, $E_x$, of the composite decreases almost linearly with the increased waviness. The equation $$E_x = -0.48191\,[l_1/(l_1+l_2)] + 1.0$$

describes the approximately linear relationship for the normalized modulus, $\overline{E}_x$.

For common waviness ratios, the normalized modulus $\overline{E}_x$, varies as follows:

| $l_1$ | $l_2$ | $(l_1/l_1 + l_2)$ | $E_x$ |
|---|---|---|---|
| 1 | 1 | .5 | .76 |
| 1 | 2 | .33 | .84 |
| 1 | 3 | .25 | .88 |
| 1 | 4 | .20 | .90 |
| 1 | 5 | .17 | .92 |
| 1 | 10 | .09 | .96 |

Thus, in the absence of other effects such as abrasion damage to the fibers during braiding, the waviness ratio must be at most 0.20 to achieve 90% of the theoretical stiffness.

Conventional biaxial and triaxial braids are shown in FIGS. 1 to 4 labeled "Prior Art". Depending on the aspect ratio AR of the yarn (i.e. AR=1=circular, AR>1 is elliptical), the waviness ratio of the biaxial braid is about 0.3 to 0.4, so modulus reductions of 15 to 20% can be expected.

$$\text{Aspect Ratio, } AR = \frac{a}{b} = \frac{\text{half-width of tow}}{\text{half-thickness of tow}}$$

This formula is based on the fact that braided tows can be modelled with reasonable accuracy as elliptical cross-sections of an experimentally derived aspect ratio. The aspect ratio is a key variable in applicants' corporate assignee's U.S. Composites' computer program "BRAID" which predicts ply thickness, fiber volume fraction, and similar structural and productivity data for biaxial and triaxial braids.

With a brittle, high modulus fiber, abrasion damage will be substantial so the mechanical properties of the composite will be further reduced.

For the triaxial braid, the waviness ratio is often as high as 0.6 or 0.7. The increase is due to the fact that the axial fibers tend to roll into a nearly circular cross-section, creating a large rib-like bundle over which the biaxial fibers must pass.

Braiding has long been employed as a textile process for the production of a variety of fabrics. More recently, this well known process, which offers the advantages of automated fiber placement and results in a seamless reinforcement of interlocked tows symmetrically oriented about an axis, has been adapted as a cost-effective method for the placement of fibers in the production of composite structures. Braiding techniques can be used to create curved shapes and parts with various cross-sections. An example of this technique for the production of skis is shown in U.S. Pat. No. 4,690,850, the disclosure of which is incorporated by reference.

In the instant invention, modified braiding is employed by the applicants such that the carriers moving in one direction are loaded with the "primary reinforcement fibers"; while the carriers moving in the opposite direction are loaded with containment fibers of substantially decreased cross-section, i.e., not more than one-fourth the cross-sectional area, and desirably less than one-tenth the cross-sectional area of the "primary reinforcement fibers". In this regard, it should be noted that the decreased cross-section, containment fibers, need not be loaded onto each opposing carrier and, in many instances, it will be advantageous to leave some of the opposing-carriers unloaded, such that the ratio of containment fibers to primary reinforcement fibers may be 1:2 or less.

The applicants have determined that superior torsional and fatigue properties are offered by asymmetric braiding of this invention making it particularly suitable for the construction of tapered, cylindrical sports equipment, such as: (a) golf club shafts, i.e., which are generally from 89 to 117 cm long, with an O.D. at the butt end of 1.5 to 1.6 cm, and tapering to an O.D. at the tip end of 0.83 to 0.95 cm; and (b) fishing rods, having lengths and diameters which vary to a greater extent, e.g., lengths of 120 to 340 cm and butt end O.D.'s of 0.6 to 2.6 cm.

In a preferred embodiment, an asymmetric braid has large tow size "primary reinforcement fibers" loaded onto carriers moving in one direction, and a partial load of fine tow size "containment fibers" on the opposing carriers. The asymmetric braid has the following characteristics and advantages:

(1) The primary reinforcement fibers require little or no twist to obtain adequate braider behavior, so the fiber bundles will lay flatter than a conventional, symmetric braid. The fiber undulation is substantially reduced, so greater strength and stiffness is obtained. The degree of reduction in such undulation will, of course, be dependent on the relative cross-sectional area of containment fiber to the cross-sectional area of the reinforcement fiber— such that relative cross-sections of less than 1:40 are most preferred.

(2) The opposing, or "containment", fibers maintain the self-stable nature of the braid by providing an interlocking action similar to that of a conventional symmetric braid. Additionally, the containment fibers maintain precise spacing and alignment of the reinforcement fibers. A composite which has uniformly spaced reinforcement fibers exhibits minimal scatter in strength and stiffness; the resulting part-to-part consistency is valuable in any structural application, since the designer will typically deduct three standard deviations from the mean strength to arrive at the design allowable strength. In filament winding, especially over tapered or complex mandrels, it is more difficult to prevent gaps from occurring between reinforcing fibers, so the scatter in the strength tests is often greater. In addition, as noted, the asymmetric braid of the invention provides stabilization of the reinforcement fibers during operations subsequent to the braiding operation, for example resin transfer molding or compression molding.

(3) The containment fibers may be of a different material than the primary reinforcement fibers, thus creating an interply hybrid composite. A hybrid can provide advantages when specific performance requirements are desired. For example, low denier (fine) tows of Kevlar may be used as containment fibers for carbon primary reinforcement fibers. The Kevlar provides resistance to crack propagation, thus containing impact damage in the laminate.

It is therefore a primary object of this invention to obtain all of the advantages of tubular braiding without incurring major penalties, such as large undulation angles and excessive abrasive damage, by significantly reducing the waviness ratio of the braid over that of conventional braids to date.

It should be appreciated that the present invention as described above is readily distinguishable over the patents cited herein and discussed at some length. For instance, in U.S. Pat. No. 4,754,685, which does discuss ranges of sizes for braidery yarns, a 0.010 inch polyester resilient monofilament is substituted by a 0.015 inch diameter nylon monofilament. The result is an area ratio of 1:2.25, substantially in excess of the maximum area ratio permitted by the claimed invention, which ratio is 1:4. Furthermore, as will be appreciated hereinafter, the loading pattern is not the same. The present invention reduces abrasive damage during braiding by reducing the severity and optionally the number of crossovers in the braiding process. In contrast, U.S. Pat. No. 4,754,685 increases the severity of the crossover and does not reduce the number of crossovers.

As to U.S. Pat. No. 4,836,080, that patent refers to a hybrid braid in which metal wire creates a protective netting to prevent abrasive damage (in service) to the flexible braided yarns. In contrast, the applicants employ as a matrix, a continuous, encapsulating solid material (for example an epoxy resin). When reinforced with strengthening fibers, a strong composite material is formed and the presence of the matrix prevents relative movement of the individual yarns. In contrast, in U.S. Pat. No. 4,836,080, such relative movement is not only possible, it is intentional.

The techniques employed in U.S. Pat. Nos. 2,494,389 and 2,608,124 vary the number and/or type of strands which comprise a thread entering into a tubular braided pattern in different regions along the length of the braided part. To create such a pattern, the strands would have to be discontinuous. These discontinuities would create local stress concentrations which diminish the strength and stiffness of a composite formed from such braid. Such teachings are opposite to that of the applicants, in which all fibers are continuous, in which the asymmetric braiding pattern provides increased strength and stiffness when the part is converted to a composite. Further, in contrast to U.S. Pat. Nos. 2,494,389 and 2,608,124, a modification is required to the conventional tubular braiding machine to increase the number of bobbins per carrier. The methods of this application require no such modifications.

In U.S. Pat. Nos. 4,550,639; 4,672,879 and 4,729,277, asymmetry of a braided mechanical compression packing is achieved by varying the number of axial (warp) fibers at different positions within the braiding pattern. However, the full number of biaxial tows are used, and these tows are all of the same size. Thus, undulation is not reduced, nor are the number of fiber cross-overs decreased, as occurs in applicants' invention. As a result, the pattern of the three patents cannot increase the strength or stiffness of a braided composite. Further, the present invention renders the absence or presence of warp fibers irrelevant. The present invention places biaxial fibers in an asymmetric pattern and is thus applicable to both a biaxial braid in which there are no warp fibers as well as to a triaxial braid containing warp fibers.

U.S. Pat. Nos. 4,754,685 and 4,836,685 describe a tubular braided sleeving having increased abrasion resistance, in which the sleeving is comprised of a resilient yarn and abrasion resistant yarn which are present in different ratios. To create the sleeving, the braider must be fully loaded and the loading pattern between clockwise and counterclockwise carriers must be symmetric. Otherwise, the sleeving would twist and distort, making it unsuitable as a covering for hoses and wires. The current invention is directed to an asymmetric loading pattern, in which all of the carriers moving in one direction, clockwise or counterclockwise, are loaded with one type of fiber, while the carriers moving in the opposite direction are loaded with a fiber of a different type. Further, not all of these carriers must be loaded. Furthermore, the symmetric loading pattern required for the sleeving neither reduces fiber undulation nor decreases fiber cross-overs.

U.S. Pat. No. 4,719,837 is directed to a method for forming a braided structure for conversion to composite by moving the braiding yarns in a repeating two-step pattern such that the braiding yarns follow diagonal paths through a multi-layer array of yarns that extend longitudinally in the structure. To create a three-dimensional braid, a special apparatus is required. The present invention is directed to a single layer, two-dimensional braid formed on a conventional tubular braider employing applicants' novel method.

DESCRIPTION OF THE PREFERRED EMBODIMENTS

The asymmetric braiding method of the present invention contrasts significantly from conventional braiding techniques, as illustrated in FIGS. 1–4. In a conventional 2-over, 2-under braided composite, indicated generally at 10, and the biaxial braided composite 10 of FIGS. 1 and 2, the tow filaments or fibers 12, 14, which intersect and which are fed diagonally opposite, define a waviness ratio in which the length 11 is the length of the wavy tow and 12 is the length of the straight tow. In the prior art biaxial braided composites, the length of the wavy tow $l_1$ is approximately ½ that of the straight tow. In composite 10, it may be assumed that the composite includes in addition to the filaments or fibers 12, 14 an impregnating resin 16 which sets under convention to produce a rigid braided composite 10.

Figures 3, 4:
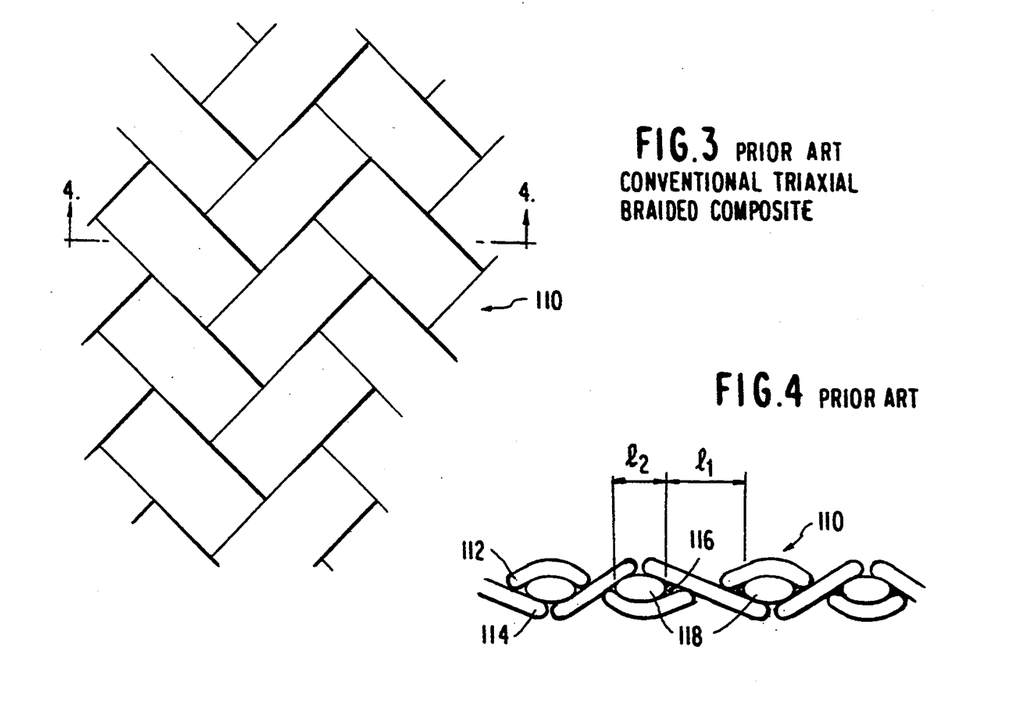
FIG. 3 is a plan view of a conventional, triaxial braid.
FIG. 4 is a sectional view of the triaxial braid of FIG. 3 taken about line 4—4.

Turning to FIGS. 3 and 4, a conventional triaxial braided composite is indicated in both figures at 110. The tows 112 and 114 are quite similar to that of prior art biaxial braided composite and equate to those at 12, 14 in the drawing FIGS. 1 and 2. In this triaxial braided composite, axial or warp fibers 118, even where oval, tend to roll into a nearly circular cross-section, as illustrated in FIG. 4, creating large rib-like bundles over which the biaxial tow fibers or filaments must pass. Again, for the triaxial braided composite 110, a hardened resin 116 impregnates the biaxial tow fibers 112, 114, as well as the axial warp fibers 118.

Figures 5, 6:
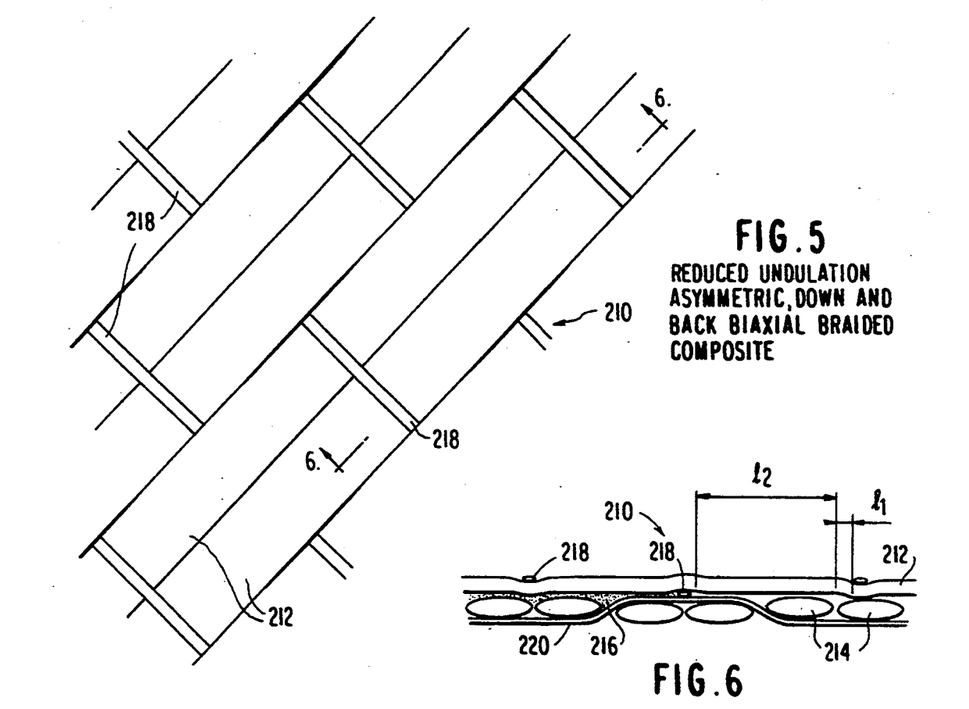
FIG. 5 is a plan view of a reduced undulation asymmetric braid forming a preferred embodiment of the invention.
FIG. 6 is a sectional view of a portion of the asymmetric braid of FIG. 5 taken about line 6—6.

The biaxial braided composite 10 and the triaxial braided composite 110 contrast significantly to the reduced undulation, asymmetric braided composite 210 forming a preferred embodiment of the invention, as illustrated in FIGS. 5 and 6.

Applicants' reduced undulation, asymmetric braiding technique makes use of the concept of tubular braiding to produce improved fiber reinforced products. Such techniques are especially useful for modern advanced fibers such as carbon, graphite, boron, etc. which typically exhibit high strength and stiffness but low elongation at failure. Because of the improved ability to braid high modulus fibers, asymmetric braided preforms will be beneficial for conversion into composites using a number of established and emerging matrix infiltration processes, for example thermoset resins using resin transfer molding ("RTM"); thermoplastic resins using comingled yarns, compression molding, powder slurry impregnation, low molecular weight precursors; ceramic matrix materials using chemical vapor deposition/infiltration ("CVD/CVI") and sol-gel methods; metal matrix materials using liquid metal infiltration, metal spray/compression molding, and intermetallic matrix materials using in-situ reacting.

An asymmetric braid is created by loading a tubular braider such as that shown in U.S. Pat. No. 4,690,850 in an intentionally uneven pattern. The reinforcing fiber is loaded onto the carriers which move in the same direction (either clockwise or counterclockwise). The carriers moving in the opposite direction are loaded differently. An asymmetric braid is thus created via the following method: a different size of (and optionally a different material) fiber reinforcement is loaded on the opposing carriers, and/or some of the opposing carriers are left unloaded. An asymmetric triaxial braid is created by introducing axial ("warp") fibers into an asymmetric biaxial braid. A typical asymmetric, down and back biaxial braided composite, FIGS. 5, 6, has large tow size reinforcing fibers 212, 214 with a partial load of very fine tow size fibers 218, 220 on the opposing carriers. In terms of the waviness ratio, a dramatic reduction is possible. As shown in FIGS. 5, 6, the braided tows can be modelled as elliptical bundles. For a biaxial braid, FIGS. 5, 6, the cross-sectional area of the fiber bundle is $A = \pi ab$. Using tows 212,218 of different area, it is evident that if the aspect ratio AR is the same, the widths of the tows will be proportional to the square root of the area ratio, i.e.:

| Area Ratio | Tow Width Ratio |
|---|---|
| 1:4 | 1:2 |
| 1:10 | 1:3.15 |
| 1:40 | 1:6.32 |

With an area ratio of 1:4, the tow width ratio is 1:2, and the waviness ratio will decrease to about 0.20. Applicants have ascertained that a modulus efficiency of 90% results. Therefore 1:4 is seen as the minimum area ratio to achieve significant benefits from reduced undulation with a biaxial braid.

As noted above, conventional braiding is modified in the instant invention such that the carriers moving in one direction are loaded with the tows as primary reinforcement fibers; while the carriers moving in the opposite direction are loaded with a containment fiber, i.e., a tow of substantially decreased cross-section, i.e., not more than one-fourth of the cross-sectional area, and desirably less than one-tenth the cross-sectional area of the primary reinforcement fibers. In this regard, the decreased cross-section, containment fibers 218, need not be loaded onto each opposing carrier and, in many instances, it will be advantageous to leave some of the opposing carriers unloaded, such that the ratio of primary reinforcement fibers 212 to containment fibers 218 may be 2:1 or greater.

The superior torsional and fatigue properties offered by asymmetric braiding in accordance with this invention make it particularly suitable for construction of tapered, cylindrical sports equipment, such as: (a) golf club shafts, i.e., which are generally from 89 to 117 cm long, with an O.D. at the butt end of 1.5 to 1.6. cm, and tapering to an O.D. at the tip end of 0.83 to 0.95 cm; and (b) fishing rods, having lengths and diameters which vary to a greater extent, e.g., lengths of 120 to 340 cm and butt end O.D.'s of 0.6 to 2.6 cm.

In a preferred embodiment, an asymmetric braid will have large tow size primary reinforcement fibers 212 for a "down" movement loaded onto carriers moving in one direction, and a partial load of fine tow size containment fibers 218 on the opposing carriers moving in the opposite direction. A second pass using the same fibers 212,218 produces the two-ply braided composite, FIGS. 5, 6; completed by solidifying resin 216.

Such asymmetric braid has the following characteristics and advantages:

(1) The primary reinforcement fibers require little or no twist to obtain adequate braider behavior, so the fiber bundles will lay flatter than a conventional, symmetric braid. The fiber undulation is substantially reduced, so greater strength and stiffness are obtained. The degree of reduction in such undulation will, of course, be dependent on the relative cross-sectional area of the reinforcement fiber—such that relative cross-sections of less than 1:40 are most preferred. The structural efficiency (i.e. specific stiffness and specific strength) can be improved through the use of such asymmetric braiding since the flatter tows pack into a higher fiber volume fraction. Abrasion damage during braiding can be greatly reduced through a reduction in the number of yarn crossovers and the minimal out of plane motion required for the small diameter containment yarns 220 to pass by the large reinforcement fibers. The operation of the resin applicator ring of U.S. Pat. No. 4,494,436 has been enhanced by the use of asymmetric braiding and by reducing the need for twist in the braided fibers, resin impregnation is improved. Since the braided tows must be kept in contact with the face of the resin applicator ring, the problem of abrasion damage is more severe than in dry braiding in which the crossovers occur in free space. Thus, the reduction in crossover damage by using asymmetric braiding of this invention is beneficial, particularly with high modulus fibers.

(2) The opposing, or "containment", fibers will maintain the self-stable nature of the braid by providing an interlocking action similar to that of a conventional symmetric braid. Additionally, the containment fibers maintain precise spacing and alignment of the reinforcement fibers. A composite having uniformly spaced reinforcement fibers exhibits minimal scatter in strength and stiffness. The resulting part-to-part consistency is valuable in any structural application, since the design will typically deduct three standard deviations from the mean strength to arrive at the design allowable strength. In filament winding, especially over tapered or complex mandrels, it is more difficult to prevent gaps from occurring between reinforcing fibers, so the scatter in the strength tests is often greater. In addition, as noted, the asymmetric braid of this invention provides stabilization of the reinforcement fibers during operations subsequent to the braiding operation, for example resin transfer molding or compression molding.

(3) The containment fibers may be of a different material than the primary reinforcement fibers, thus creating an interply hybrid composite. Such hybrid provides advantages when specific performance requirements are desired. For example, low denier (fine) tows of Kevlar may be used as containment fibers for carbon primary reinforcement fibers. The Kevlar will provide resistance to crack propagation, thus containing impact damage in the laminate.

(4) It will normally be necessary to replace each pass through the braider with two passes when an asymmetric construction in accordance with this invention is used. However, the reduced abrasion damage permits an increase in the braiding speed which minimizes the additional processing time.

EXAMPLES

The applicability of this invention will better be appreciated by referring to the following illustrative examples:

(i) Production of a Golf Club Shaft

The benefits (light weight, superior damping, etc.) that composites can offer in the fabrication of sporting equipment are well known. Thus virtually all tennis rackets, fishing rods, pole vaulting poles, etc., are now made of composites. However, the composite golf club shafts produced about a decade ago failed to displace steel as the material of choice, primarily because those shafts exhibited poor torsional rigidity—resulting in twisting of the golf club head and irregular shot patterns. Present day technology now permits the construction of a composite shaft with torsional rigidity comparable to that of the steel shaft. Therefore, composite golf shafts, even though significantly more expensive, are now gaining in importance. The bulk of composite shafts are presently produced by hand lay-up techniques, utilizing from six to fourteen overlapping prepeg layers of predominantly graphite-reinforced fiber. Such overlapping prepegs create a shaft of non-uniform cross-section—resulting in a shaft which exhibits different flex characteristics, depending on the orientation of the shaft to the face of the golf club head.

As noted, the achievement of high torsional stiffness is of prime importance, such that in the most expensive composite shafts produced by hand lay-up techniques, the art has resorted to the use of boron (which has a higher modulus than that of high modulus graphite) to provide the requisite torsional stiffness. To overcome the inherent inconsistency in properties resulting from the use of hand lay-up techniques, manufacturers are now developing filament winding and braiding techniques for the production of golf club shafts. In the production of a composite golf shaft using braiding techniques, both axial and helical fibers are oriented over a small diameter, tapered mandrel to provide the necessary proportions of bending and torsional strength and stiffness, in a manner somewhat analogous to that shown in the U.S. Pat. No. 4,690,850. Using such braiding techniques, it is the helical fibers which are solely responsible for the torsional properties of the shaft. It was postulated that the large fiber undulation in the helically placed braided tows may significantly reduce the torsional stiffness, and that asymmetric braiding would provide a marked improvement in both torsional stiffness and in fatigue properties by substantially eliminating such undulation. In comparison to a conventional tubular braid, the reinforcing fibers using applicants' invention which should be flatter and wider, thereby provide maximum coverage with minimum undulation. Moreover, the resultant thinner plies permit greater packing density, so as to provide a higher volume fraction equivalent to that achievable utilizing filament winding.

To verify the postulated improvements, two shafts were produced—one utilizing conventional braiding and the other utilizing applicants' asymmetric braiding technique. Both shafts contained three basic layers: an inner layer of helically laid ($\pm 45°$) fibers. In both cases, the reinforcing fibers consisted of 12 k, high modulus (55 MSI) carbon fiber. In the "conventional" sample, the helical fibers were laid by loading a sixteen carrier tubular braider with eight spools of the 12 k fiber in each of the clockwise and counterclockwise directions. In the "asymmetric" sample, the helically laid tows, i.e., the $\pm 45°$ plies in each of the two layers, were placed by loading the same sixteen carrier tubular braider with eight spools of 12 k fiber in one direction, while only four spools of D450 1/0 fiberglass were loaded in the opposite direction to provide the containment fibers for each of the four helical plies (two $\pm 45°$ plies for each layer). The relative cross-sectional area of reinforcement fiber to containment fiber was approximately 100:1. After completion of fiber placement, both samples were placed in a mold and were resin transfer molded with the same epoxy resin—utilizing the same injection pressures and curing cycle. The two samples were then tested for their: (1) torsional stiffness; and (b) fatigue durability, utilizing tests which are somewhat conventional in the industry.

(a) Torsional Stiffness

In this test, the shaft is clamped at the butt end, while a weighted rod is affixed perpendicular to the shaft, at a point one inch from the tip end of the shaft. A one-pound weight is attached to the rod at a distance of one foot from the axis of the shaft, to provide a torque of approximately one-foot pound. The degree of twist in the shaft produced by that torque is read on a scale in degrees—such that a shaft with superior torsional rigidity exhibits a smaller angle of twist. In the test conducted, the shaft produced by the "conventional" method exhibited a torsional angle of 3.37° (average of four readings); while the shaft produced by the "asymmetric" method produced a torsional angle of 2.96° (average of four readings). The product produced by this invention showed an improvement in stiffness in excess of twelve percent.

(b) Fatigue Durability

This is a destructive test, in which a clubhead is affixed to the shaft. The grip (butt end) is then clamped in a machine which raises the assembled golf club to strike a ball approximately 13 times per minute at a swing speed of 7.62 m/sec. The ball, which weighs 1071 gms. (compared with the 40 gm weight of the average golf ball) slides up-and-down a curved track, so that it will return to its original position—ready to be struck again by the club being tested. This striking of the ball is continued to shaft breakage or to 10,000 strokes. As a representative figure, good quality regular weight steel shafts will normally exhibit breakage after about 1,000 strokes, lightweight steel shafts break after about 300 strokes, and good quality composite shafts break within the range of 5,000 to 10,000 strokes.

In the test conducted, the shaft produced by the "conventional" braiding method broke after only 115 strokes, while the shaft produced by the "asymmetric" method showed no breakage after 10,000 strokes—at which time the test was discontinued.

(ii) Production of Hydraulic Hose

Hydraulic hose is typically produced using one of two constructions: braided fiber reinforcement over an elastomeric liner, or helically wrapped fiber over a similar elastomeric liner. The latter construction provides a higher theoretical efficiency of reinforcement because fiber undulation is minimized and packing density (fiber volume fraction) is maximized. Even with such advantages, however, the helically wrapped construction has not gained wide acceptance, because repeated flexing of the hose can lead to separation of the wraps—creating a weak spot at which the hose can rupture. By utilization of "asymmetric" braiding based on the method of this invention, undulation effects are minimized and optimum fiber packing achieved, while nevertheless maintaining the stability of fiber orientation during cyclical pressurization and flexing.

(iii) Production of Insensitive Munitions

It is desirable to have munition products with cases or housings which exhibit requisite strength under normal use conditions (pressure, temperature, etc.) but which rapidly lose strength under accident conditions, such that they are safer when exposed to accident conditions such as bullet impact or exposure to fires. A conventional, aluminum-cased, 2.75 inch artillery rocket was replaced with a triaxially braided Kevlar/epoxy composite case in accordance with the prior art FIGS. 3, 4. A layer of axial graphite/epoxy was incorporated to provide bending stiffness equivalent to that of the aluminum case. Although the braided composite case performed well in most respects, the exceptional toughness characteristic of the braided composite proved to be a disadvantage with respect to insensitive munitions (IM) performance. Thus, in a 20 mm bullet impact test, the braided case otherwise remained intact. As a result, the bullet ignited the rocket propellant, and the rocket went propulsive. With optimum IM performance, the case would break apart—permitting the propellant to burn like a flare. This "toughness disadvantage" of conventional braiding was overcome by applicants' asymmetric braiding technique of this invention, wherein the crossover "containment" fibers, which normally would provide toughening structural reinforcement, are by design eliminated during the molding process. Improved IM performance is achieved by utilizing a "containment fiber", which experiences a significant loss in strength during the final portion of the molding process. Applicants determined, for example, that Allied Spectra ®, extended polyethylene fiber has high strength up to about 250° F. and can be used as a containment fiber in an asymmetric braid to minimize distortion of the plies during resin transfer molding. A resin system was chosen that can be cured, i.e., achieve initial gelation, at temperatures below about 250° F., such that the Spectra fiber retains most of its strength—thereby stabilizing the primary reinforcement fibers in their precise orientation. After such initial gelation, the resin was postcured at a higher temperature, e.g., 50° to 100° higher, to achieve full resin properties. At this post-cure temperature, the containment Spectra fiber experienced an irreversible loss of strength, such that these fiber crossovers no longer provide any toughening to the final part, e.g., the rocket case. As a result, upon bullet impact, the low fracture toughness resin, itself, is unable to absorb the energy and massive delamination of the case results.

The examples above are described as using dry braiding and resin transfer molding for the fabrication of composites. It should be understood, however, that one of the principal advantages of the instant invention, elimination or lessening of undulation angles, can also be realized in other composite fabrication methods well known to the art. For example, wet braiding, as shown in U.S. Pat. No. 4,494,436, can use the asymmetric braiding technique of this invention. In the latter instance, prior to placement of the fibers, resin is applied to all the fiber bundles—eliminating the need for later resin application. Subsequently, the wet-braided part must be: (i) wrapped in tape and cured directly in an oven (analogous to the method now employed to cure hand laid-up composite golf shafts); or (ii) placed into a flexible bladder which is externally pressurized and heated to provide consolidation and curing of the resin.

While the invention has been described in detail and with reference to specific embodiments thereof, it will be apparent to one skilled in the art that various changes and modifications can be made therein without departing from the spirit and scope thereof.

What is claimed is:

1. In a process for the production of an article having at least one composite layer composed of a matrix material reinforced by substantially continuous, oriented reinforcement fibers including: braiding fibers crossing each other in an undulating, woven pattern and impregnating said fibers with a settable matrix material to create said at least one composite layer, the improvement wherein said braiding step comprises: asymmetrically braiding crossing reinforcement and containment fibers having different cross-sectional areas to substantially decrease the amplitude of such undulations, with the cross-sectional area of a containment fiber oriented in one direction being less than one-fourth the cross-sectional area of a crossing complementary primary reinforcement fiber such that said at least one composite layer has both high torsional stability and high fatigue durability.

2. The process of claim 1, further comprising the step of introducing into the braid, axial (warp) fibers to create an asymmetric triaxial construction.

3. The process of claim 1, wherein said step of impregnating said braiding fibers comprises impregnating said fibers with at least one matrix material of the group consisting of a thermoplastic resin, a thermosetting resin, a ceramic matrix material and a metal matrix material.

4. The process of claim 1, wherein the cross-sectional area of said containment fiber is less than one-tenth the area of the primary reinforcement fiber.

5. The process of claim 4, wherein the containment fiber is a material different from that of the material of said primary reinforcement fiber.

6. The process of claim 5, wherein said braiding step comprises braiding a containment fiber having a tensile modulus substantially lower than a tensile modulus of said primary reinforcement fiber.

7. The process of claim 5, wherein the step of braiding said fibers comprises braiding a containment fiber of a material having strength properties which markedly deteriorate at a temperature substantially lower than the deteriorating temperature of one of said primary reinforcement fiber and said matrix materials.

8. The process of claim 4, wherein the ratio of containment fibers to primary reinforcement fibers is <1:2.

9. The process of claim 4, wherein the cross-sectional area of the containment fiber is less than one-fortieth the cross-sectional area of said diagonally complementary reinforcement fiber.

10. A cylindrical article having a length in excess of 89 cm, produced by a process for the production of such article having at least one composite layer composed of a matrix material reinforced by substantially continuous, oriented reinforcement fibers including: braiding fibers crossing each other in an undulating, woven pattern and impregnating said fibers with a settable matrix material, the improvement wherein said braiding step comprises; asymmetrically braiding crossing reinforcement and containment fibers having different cross-sectional areas to substantially decrease the amplitude of such undulations with the cross-sectional area of a containment fiber oriented in one direction being less than one-fourth the cross-sectional area of a crossing complementary primary reinforcement fiber, and impregnating said braiding fibers with at least one matrix material of the group consisting of a thermoplastic resin, a thermal setting resin, a ceramic matrix material and a metal matrix material such that said at least one composite layer has both high torsional stability and high fatigue durability.

11. A cylindrical article having a length in excess of 89 cm, produced by a process for the production of such article having at least one composite layer composed of a matrix material reinforced by substantially continuous, oriented reinforcement fibers including:

braiding fibers crossing each other in an undulating, woven pattern and impregnating said fibers with a settable matrix material, the improvement wherein said braiding step comprises:

asymmetrically braiding crossing reinforcement and containment fibers having different cross-sectional areas to substantially decrease the amplitude of such undulations, with a cross-sectional area of a containment fiber oriented in one direction being less than one-fortieth the cross-sectional area of a crossing complementary primary reinforcement fiber such that said at least one composite layer has both high torsional stability and high fatigue durability.

12. In a process of forming an article comprising: braiding at least one braided layer of fibers crossing each other in an undulating, braided pattern and impregnating said fibers with a settable matrix material, the improvement wherein said step of braiding said crossing fibers comprises: asymmetrically braiding fibers of different cross-sectional areas to substantially decrease the amplitude of such undulations with the cross-sectional area of a containment fiber oriented in one direction being less than one-fourth the cross-sectional area of a crossing complementary primary reinforcement fiber wherein the impregnated at least one braided layer article has both high torsional stability and high fatigue durability.

13. The process of claim 12, wherein the step of asymmetrically braiding said fibers of different cross-sectional areas to substantially decrease the amplitude of such undulations comprises asymmetrically braiding crossing of fibers with the cross-sectional area of a containment fiber oriented in one direction being less than one-tenth the cross-sectional area of a crossing complementary primary reinforcement fiber.

14. A cylindrical article having a length in excess of 89 cm, produced by the process comprising: asymmetrically braiding at least one braided layer of fibers crossing each other in an undulating, braided pattern of different cross-sectional areas to substantially decrease the amplitude of such undulation with the cross-sectional area of a containment fiber oriented in one direction being less than one-fourth the cross-sectional area of a crossing complementary primary reinforcement fiber and impregnating said fibers with a settable matrix wherein said cylindrical article has both high torsional stability and fatigue durability.

15. A hollow braided composite article having a axis of symmetry, said article comprising at least one braided composite layer comprising asymmetrically braided crossing primary reinforcement and containment fibers embedded in a set matrix, the cross-sectional area of each containment fiber oriented in one braiding direction being less than one fourth the cross-section area of a crossing complementary primary reinforcement fiber, thereby substantially reducing undulation of respective fibers at braiding crossing points such that said at least one composite layer of said article has both high torsional stability and high fatigue durability.

16. The article as claimed in claim 15, wherein said matrix material is at least one material of the group consisting of a thermoplastic resin, a thermal setting resin, a ceramic matrix material, a metal matrix material and an inter-metallic material.

17. The article as claimed in claim 15, wherein said braided fibers are formed of one material of the group consisting of carbon, graphite, boron.

18. The article as claimed in claim 15, further comprising braided axial (warp) fibers forming an asymmetric triaxial matrix layer.

19. The article as claimed in claim 15, where the ratio of containment fibers to primary reinforcement fibers is <1:2.

20. The article as claimed in claim 15, wherein the cross-sectional area of the containment fiber is less than one-fortieth the cross-sectional area of said diagonally complementary reinforcement fiber.

* * * * *